United States Patent
Barbot et al.

(10) Patent No.: US 11,249,802 B2
(45) Date of Patent: Feb. 15, 2022

(54) METHOD FOR EXECUTING SEQUENCING PLANS ENSURING LOW-LATENCY COMMUNICATION BETWEEN REAL-TIME TASKS

(71) Applicant: KRONO-SAFE, Massy (FR)

(72) Inventors: Adrien Barbot, Palaiseau (FR); Vincent David, Marcoussis (FR); Emmanuel Ohayon, Orsay (FR)

(73) Assignee: KRONO-SAFE, Orsay (FR)

(*) Notice: Subject to any disclaimer, the term of this patent is extended or adjusted under 35 U.S.C. 154(b) by 0 days.

(21) Appl. No.: 16/755,263

(22) PCT Filed: Oct. 8, 2018

(86) PCT No.: PCT/FR2018/052476
§ 371 (c)(1),
(2) Date: Apr. 10, 2020

(87) PCT Pub. No.: WO2019/073156
PCT Pub. Date: Apr. 18, 2019

(65) Prior Publication Data
US 2021/0224112 A1   Jul. 22, 2021

(30) Foreign Application Priority Data
Oct. 10, 2017   (FR) ..................... 17 59487

(51) Int. Cl.
*G06F 9/46* (2006.01)
*G06F 9/48* (2006.01)

(52) U.S. Cl.
CPC ................. *G06F 9/4887* (2013.01)

(58) Field of Classification Search
CPC ..................................... G06F 9/4887
See application file for complete search history.

(56) References Cited

FOREIGN PATENT DOCUMENTS

| EP | 1 519 269 A2 | 3/2005 |
| FR | 2 965 947 A1 | 4/2012 |
| FR | 3 004 274 A1 | 10/2014 |

OTHER PUBLICATIONS

Dec. 13, 2018 Search Report issued in International Patent Application No. PCT/FR2018/052476.

*Primary Examiner* — Gregory A Kessler
(74) *Attorney, Agent, or Firm* — Oliff PLC

(57) ABSTRACT

A method for constructing off-line a sequencing plan for a plurality of tasks executed on a real-time system, including decomposing each task into a sequence of frames, where each frame is associated with an elementary process having an execution need, and defines a start date from which the process can start and an end date, or deadline, at which the process must complete; associating respective order constraints with pairs of processes; projecting the dates on a time scale associated with an execution unit of the real-time system, thus forming a sequence of time slots; sequentially parsing the time slots of the sequence; identifying eligible processes in a current time slot, a process being eligible if it meets the following two criteria: i) it is executable in the current time slot, and ii) if it has an order constraint.

12 Claims, 3 Drawing Sheets

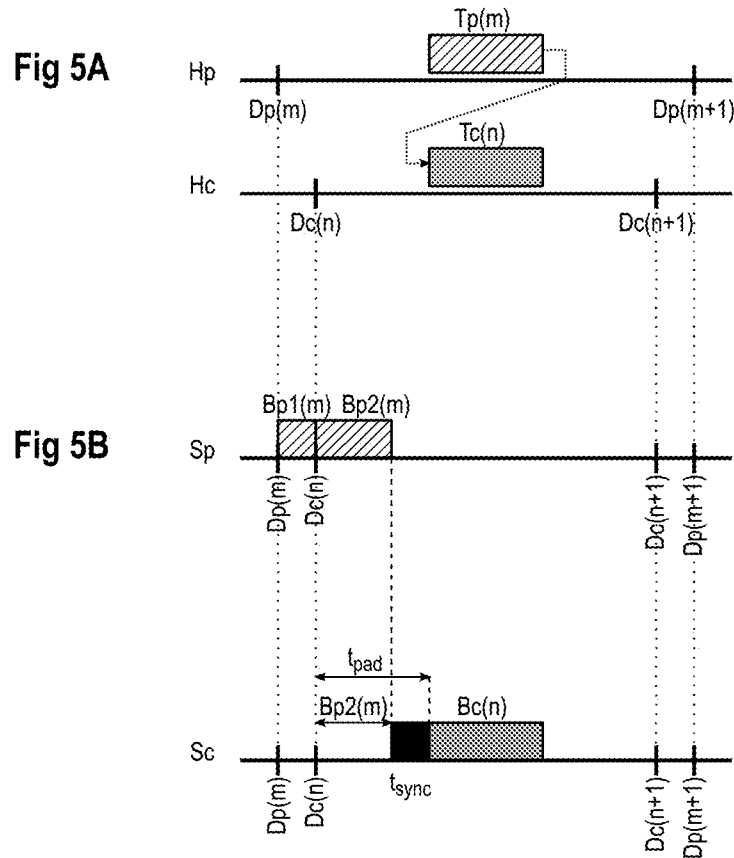

METHOD FOR EXECUTING SEQUENCING PLANS ENSURING LOW-LATENCY COMMUNICATION BETWEEN REAL-TIME TASKS

TECHNICAL FIELD

The invention relates to hard real-time multitasking systems, and more specifically to techniques for inter-task communication in such systems.

BACKGROUND

In hard real-time systems, i.e. systems that do not tolerate any deadline violation through a delay in the execution of an operation, tasks are often executed using static scheduling methods. A static sequencing plan is then constructed offline, representing a static time allocation of the need to use execution resources. Such an approach is described, for example, in the paper ["A Method and a Technique to Model and Ensure Timeliness in Safety Critical Real-Time Systems", C. Aussaguès, V. David, Fourth IEEE International Conference on Engineering of Complex Computer Systems, 1998], and in patent applications WO2006-050967 and US2010-0199280.

A static sequencing plan may include several parallel tasks to be executed in time-sharing mode on an execution unit. The tasks may also communicate with each other. For example, a first task may take regular measurements from a sensor, while a second task may sample the measurements produced to implement a control.

In such a configuration, latencies can occur between the moment when data is provided by a producing task and the moment when the data is read by a consuming task. In some situations, latencies can be so large that they affect the stability or responsiveness of a control system using the data produced.

SUMMARY

A method is generally provided for constructing off-line a sequencing plan for a plurality of tasks to be executed on a real-time system, comprising the steps of decomposing each task into a sequence of frames, wherein each frame is associated with an elementary process having an execution need, and defines a start date from which the process can start and an end date, or deadline, at which the process must complete; associating respective order constraints to process pairs; projecting the dates on a time scale associated with an execution unit of the real-time system, thus forming a sequence of time slots; sequentially parsing the time slots of the sequence; identifying eligible processes within a current time slot, a process being eligible if it meets the following two criteria: i) it is executable in the current slot, and ii) if it has an order constraint, the process referenced by the order constraint is also executable in the current time slot, or the deadline of the referenced process is in a previous time slot; sorting the eligible processes in a list by order of increasing deadlines; modifying the list to reorder the processes according to their order constraints; and distributing the execution needs of the eligible processes in the current time slot in the order of the list to build the sequencing plan.

The method may comprise an initial step of removing order constraints in each pair formed of two processes whose frames do not overlap.

The step of modifying the list and the step of distributing the execution needs may comprise the steps of parsing the list of processes sequentially; if a current process in the list has an order constraint referencing a process placed after the current process in the list, modifying the list by moving the referenced process before the current process; resuming the list parsing starting at the position of the moved referenced process; otherwise placing the execution need of the current process in the current slot.

The step of placing the execution need may comprise the steps of placing the execution need fully in the current slot if the slot has enough space to accommodate it; otherwise filling the current slot with a first part of the execution need and postponing the placement of the remainder of the execution need to a subsequent slot.

The real-time system may comprise a plurality of execution units. Then, the method may further comprise the steps of associating with each execution unit a copy of the sequence of time slots to form a sequencing plan for each execution unit; allocating execution units to tasks such that processes linked by order constraints are executed on different execution units; in the execution need placement step: i) placing the execution need in the current slot of the plan associated with the current process, and ii) placing in the current slot of the plan associated with the referenced process a padding interval corresponding to the placed execution need increased by a synchronization time taking into account delays occurring in the communication of data between two execution units and an offset between the clocks of the two execution units.

The step of placing the execution need in the current slot may comprise placing the execution need in any padding interval contained in the current slot.

A method may also be provided for executing tasks in a real-time multitasking system, comprising the steps of producing a multi-task sequencing plan according to the above method; configuring a real-time multitasking system execution unit to apply the sequencing plan in a loop; configuring a time base of the real-time multitasking system to clock the time slots of the sequencing plan; sequentially running the eligible processes of each slot in the order in which the corresponding execution needs are distributed within the slot; and checking that the process execution times conform with the corresponding execution needs.

BRIEF DESCRIPTION OF THE DRAWINGS

Embodiments will be set out in the following non-limiting description, in relation to the attached figures among which:

FIGS. 5A and 5B illustrate a pair of sequences of frames representing an example of two communicating tasks, and two corresponding sequencing plans, respectively constructed for two execution units using a method for reducing or even cancelling communication latency.

DESCRIPTION OF EMBODIMENTS

Figure 1A:
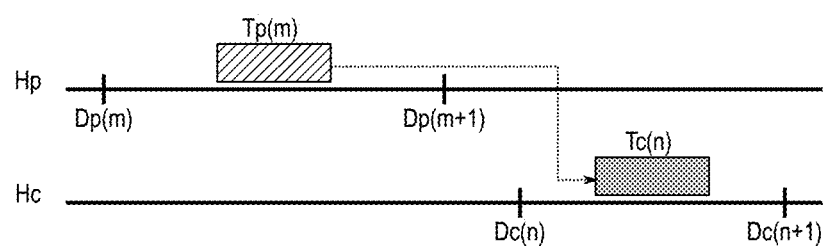
FIGS. 1A and 1B illustrate an example of two tasks that can communicate, in a format called sequence of frames.

FIG. 1A shows an example of a task Tp that produces data and an example of a task Tc that consumes data, which tasks are to be run in parallel on a real-time system. Each task can be formalized as proposed in Krono-Safe's patent application US2017-0004011. Accordingly, each task is broken down into a repetitive sequence of frames, each frame being associated with an elementary process Tp(m), Tc(n) (where m and n are sequence numbers of the processes). The boundaries of the frame are defined by synchronization points or dates Dp, Dc which form the time constraints of the process. Each process can start from the first synchronization point, or start date, and must end at the latest at the second synchronization point, or deadline.

The synchronization points are chosen according to a time base Hp, Hc which clocks the real-time system during execution. They are often periodic or grouped in periodic sequences.

In addition, each process has an execution need, hereafter noted B, which can be formalized by a time interval less than the length of the corresponding frame, which is for example a Worst-Case Execution Time (or WCET). The execution need may be used in any way in the frame, in a single piece or in several non-contiguous segments, depending on the constraints implemented in a later phase of construction of a static sequencing plan.

To establish an inter-task communication, individual processes of the task Tp can be designed to produce data for processes of task Tc. Here the process Tp(m) produces data for the process Tc(n). The data is exchanged via a shared memory, for example. Thus, the end of the process Tp(m) is usually designed to write the data to the shared memory, and the beginning of the process Tc(n) is designed to read the data from the shared memory.

In the example of FIG. 1A, the start date Dc(n) of process Tc(n) is after the deadline Dp(m+1) of process Tp(m). This means that the process Tc(n) will always be able to consume the data produced by the process Tp(m), but with a latency greater than Dc(n)–Dp(m+1).

Figure 1B:
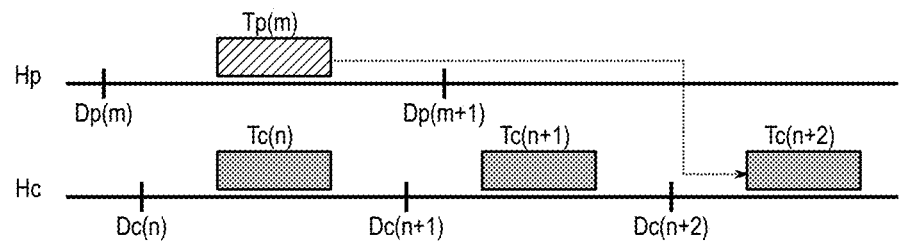

In the example in FIG. 1B, the start date Dc(n) of the process Tc(n) is before the deadline Dp(m+1) of the process Tp(m). This means that it cannot be guaranteed in all cases that the process Tc(n) can consume the data produced by the process Tp(m). Furthermore, the start date Dc(n+1) of the process Tc(n+1) is also before the deadline Dp(m+1). In this case, the first process that can reliably consume the data is Tc(n+2), with a latency greater than Dc(n+2)–Dp(m+1).

Figure 2A:
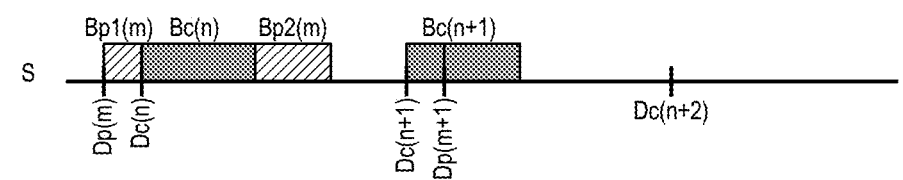
FIGS. 2A and 2B represent two possibilities for constructing a sequencing plan from the tasks in FIG. 1B.

FIG. 2A illustrates a static sequencing plan segment that could be generated automatically by a development tool from the sequences of frames of the tasks Tp and Tc as shown in FIG. 1B.

Such a tool may be designed to project on a time scale S the synchronization points of all tasks, creating a sequence of consecutive time slots. If the real-time system comprises several processor cores or execution units, the tool will produce a separate synchronization point projection for each execution unit. The tool processes these slots in sequence to distribute the process needs such that the time constraints are satisfied, if possible—in some cases, the tool may not find a solution, meaning that the developer would have to perform a new iteration, for example after reducing the number of parallel tasks or relaxing constraints.

More specifically, for each time slot observed, the tool lists the processes that are eligible for execution in the slot, i.e. each process that can start or continue in the observed time slot. A process that can "continue" in the observed time slot is in fact a remainder of a process that was started in a previous time slot. Indeed, a frame can overlap several slots—in this case, the execution need of the corresponding process may be fragmented over the overlapped slots. At runtime, the fragmentation results in suspensions and resumptions of the corresponding process, by operating system preemption, each suspension and resumption costing a fixed overhead for saving and restoring the process execution context. Since the fragmentation is achieved statically, a fixed overhead margin can be determined, which may be added to the execution need when checking compliance with the time constraints.

For the eligible processes, the tool distributes the execution needs in a given order in the slot—preferably by increasing order of deadlines. If the deadlines are identical, which happens regularly when the synchronization points are periodic or harmonic, the execution needs may be distributed in an arbitrary order, for example, in alphabetical order of the process identifiers.

In FIG. 2A, the only eligible process in slot [Dp(m), Dc(n)] is Tp(m). This slot is filled by a first part Bp1($m$) of the need of process Tp(m). In the next slot [Dc(n), Dc(n+1)], the processes Tc(n) and Tp(m) are eligible. The order of the deadlines implies that the need Bc(n) of process Tc(n) is placed first, followed by the residue Bp2($m$) of the need of process Tp(m).

This sequencing plan, which could be obtained using all the parameters and constraints conventionally available, shows that the data produced by the process Tp(m) could not be consumed by the process Tc(n), which led to the choices illustrated in FIGS. 1A and 1B for the consuming processes.

Figure 2B:
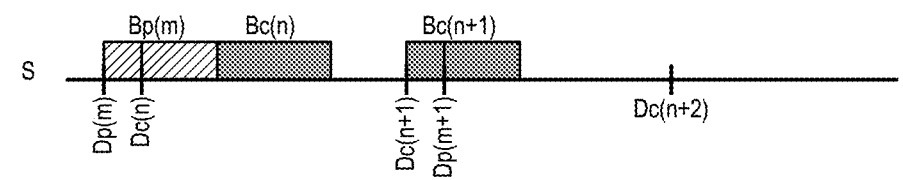

In contrast, FIG. 2B illustrates a sequencing plan compatible with the tasks in FIG. 1B, where the process Tc(n) can consume the data produced by the process Tp(m) without latency. In this example, it is sufficient to place the residue Bp2($m$) before the need Bc(n), as shown.

(Note that the examples illustrated so far are case studies developed for sake of clarity. The cases in FIGS. 2A and 2B, where a result obtained by a given method is compared with a desired result, lead to a solution that might seem trivial. However, this must be mitigated by the fact that the solution is intended to work in a general and automated way in a practical situation, where a sequencing plan is generated for many parallel tasks, each of which may have many processing and communication interdependencies.)

A methodology is proposed below for tending towards zero latency sequencing plans of the type shown in FIG. 2B, by introducing order constraints designated by C between processes chosen by the developer. Thus, a process formalized by a frame (a start date, a deadline, and an execution need), can be characterized in addition by an order constraint referencing another process.

For the method to be useful in practice, the frames of the two processes linked by such an order constraint have an overlap, i.e. there is a common time interval where the two linked processes are executable simultaneously. As a result, the two linked processes are taken from two separate tasks (e.g. the processes Tp(m) and Tc(n) or Tc(n+1) in FIG. 1B). Otherwise, the order constraint would be systematically satisfied by the time constraints, and would be redundant (case of FIG. 1A, for example).

The two processes of the pair thus formed are characterized by reciprocal constraints, a precedence constraint for one, and a posteriority constraint for the other. The precedence constraint requires the corresponding process to be completed before the start of the referenced process, while the posteriority constraint requires the corresponding process to start after the end of the referenced process. According to an embodiment, the same process can be subject to several order constraints, which makes it possible to build chains of dependencies between processes, and generally speaking a dependency tree.

The posteriority and precedence constraints of a process pair are reciprocal—one can thus exploit only one of these reciprocal constraints to build a sequencing plan. In the following description, only the posteriority constraint is exploited. As a result, in each pair of linked processes, only one of the processes has a posteriority constraint, and the other process can be considered as having no constraint. (An equivalent alternative would be to exploit only the precedence constraint.)

The development tool is then designed to take into account these new constraints to build a static sequencing plan integrating all the tasks. More specifically, the tool may implement the following steps on a group of parallel tasks defined by sequences of frames and a set of posteriority constraints:

1. The dates corresponding to the synchronization points of the tasks are projected on a same time scale S in order to obtain a sequence of time slots. The sequence of time slots forms the skeleton of the sequencing plan.
2. The time slots are parsed sequentially, and a current time slot is observed.
3. The list of eligible processes in the current slot is identified, i.e. the set of processes that meet the following two criteria:
    3.1. The process is executable, that is, the current time slot is included between the start and end dates of the process; and
    3.2. If the process has a posteriority constraint C, the process referenced by this constraint is also executable (e.g. FIG. 1B, interval [Dc(n), Dc(n+1)], assuming that Tc(n) references Tp(m)), or the deadline of the referenced process is in a previous time slot (FIG. 1A).
    This criterion eliminates any process that consumes data that may not be available in the current slot.
    In an embodiment where dependency chains between processes are implemented, this criterion may involve running through the dependency tree to determine that all processes in the tree are executable. Then, if at least one of the processes in the tree is not executable, the whole tree is removed from the eligible processes.
4. The eligible processes are ordered by ascending deadlines and placed in a sorted list. This list provides a starting point for determining the order in which the corresponding execution needs are placed in the current slot of the sequencing plan.
The list is likely to contain pairs of processes linked by order constraints, and it is not guaranteed that the processes of each pair are placed in the right order (producer-consumer). The following steps are intended to reorder the list so that each consumer process is placed after its respective producer process.
5. The sorted list is parsed sequentially, and the current process of the list is observed.
    5.1. If the current process does not have a posteriority constraint, then the execution need corresponding to this process is placed in the current slot. This execution need may be the residue from a previous slot. The residue may be zero, meaning that the execution need was fully placed in a previous slot. If the execution need cannot be fully placed in the current slot, the current slot is filled with a first portion of the execution need and the remaining portion is saved for the next slot. The process is repeated from step 5.

It is possible in some situations, at this stage, that the end of the current slot is the deadline of the current process and that the slot cannot contain the execution need. The tasks as defined are then not executable in parallel on the real-time system under consideration, and the developer may need to redesign the tasks.

The execution needs are preferably placed contiguously from the beginning of the slot, in order to leave as much space as possible at the end of the slot.

5.2. If the current process has a posteriority constraint:
    5.2.1. If the referenced process is placed before the current process in the list, the order of the list is correct. The execution need of the current process is placed as in step 5.1, and the procedure is repeated from step 5.
    Depending on the situation, the two related processes may be separated by another process in the list. In this particular case, the communication latency will not be zero, but it will be significantly lower than if the two processes were executable in different slots.
    5.2.2. If the referenced process is placed after the current process in the list, the list is modified by moving the referenced process before the current process, preferably immediately before to achieve zero latency communication. The procedure is repeated from step 5 by resuming from the same position in the list, position which now contains the process that has just been moved.
    In the case of a chain of dependencies, the moved process could also have a posteriority constraint, in which case a new modification of the list may occur upon reiteration of step 5.2.
6. The method is repeated from step 2 for the next time slot.

The method may include an initial step to remove redundant order constraints, i.e. those that are necessarily respected by the configuration of the synchronization points. Such constraints always occur in processes with non-overlapping frames.

The method is applicable to an infinite sequence of frames. Of course, in a practical case, each task is defined by a finite sequence of processes, in particular a repetitive sequence. The combination of several tasks in a sequencing plan then naturally produces a repetitive sequencing plan whose period is the smallest common multiple of the periods of the repetitive sequences composing the individual tasks, but it is also possible to produce a repetitive sequencing plan of arbitrary length. In either case, it is possible to leave the iterations of the method when a repetition of the sequencing plan is detected.

A sequencing plan thus developed is used to configure the real-time multitasking system to constrain the execution of tasks. More specifically, the execution unit is configured to apply the sequencing plan in an infinite loop. The time base of the system is set up to produce synchronization points that clock the time slots. In each slot, the execution unit starts (or resumes) the processes sequentially according to the placement of the execution needs in the slot. A watchdog controls the conformity of the execution times of the processes with the corresponding execution needs.

Figure 3A:
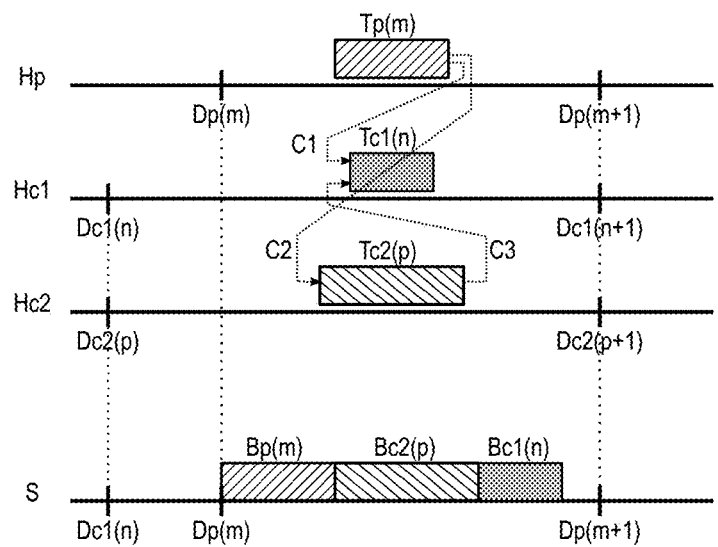
FIGS. 3A and 3B illustrate a group of sequences of frames representing an example of three communicating tasks, and a corresponding sequencing plan constructed using a method to reduce or even eliminate communication latency.

FIG. 3A will be used to illustrate an implementation of the above method using a relatively complex example. In this example, a task Tp produces data that is consumed by two other tasks Tc1 and Tc2. The data is produced by a process Tp(m) associated with a frame having a start date Dp(m) and a deadline Dp(m+1). The data is consumed by two respective processes Tc1(n), Tc2(p) of the two tasks Tc1 and Tc2, which is formalized by posteriority constraints C1 and C2.

In addition, the process Tc1(n) consumes data produced by the process Tc2(p), which is formalized by a posteriority constraint C3. The processes Tc1(n) and Tc2(p) are associated with two frames of a same length and having the same deadline Dc1(n+1), Dc2(p+1) as the process Tp(m).

The start dates Dc1(n), Dc2(p) of the processes Tc1(n) and Tc2(p) are equal and earlier than the start date of the process Tp(m).

Figure 3B:
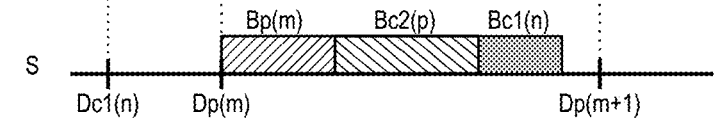

FIG. 3B illustrates a sequencing plan resulting from the application of the above method steps.

In step 1, the dates of the different tasks are projected on a scale S. Among several equal dates, only the first is indicated.

At a first iteration of step 2, the slot [Dc1(n), Dp(m)] is observed.

In step 3, no process is selected as eligible. Indeed, although processes Tc1(n) and Tc2(p) are executable, they are linked by a posteriority constraint C1, C2 to process Tp(m), which is not executable in the current slot. As shown in FIG. 3B, the slot remains empty.

Step 2 is repeated to observe the slot [Dp(m), Dp(m+1)].

In step 3, the three processes are executable according to criterion 3.1. They are also eligible according to criterion 3.2, as they have no posteriority constraint referring to a non-executable process.

In step 4, the processes are placed in a list, normally sorted by ascending deadlines. Since the deadlines are equal, the processes are sorted in an arbitrary order, for example in the alphabetical order of their identifiers. The list would then be {Tc1(n), Tc2(p), Tp(m)}. This order is incorrect and will be corrected in the next steps.

In step 5, the first process in the list, Tc1(n), is considered. Since this process has a posteriority constraint C1 "after Tp(m)", step 5.2 is executed. Test 5.2.1 fails, and step 5.2.2 is executed. As a result, the process Tp(m) is moved before the process Tc1(n), providing the list {Tp(m), Tc1(n), Tc2(p)}.

Step 5 is resumed to observe the same position in the list, now containing the process Tp(m). The test in step 5.1 is passed because the process Tp(m) has no posteriority constraint. The execution need Bp(m) of this process may be placed fully at the beginning of the current slot, as shown in FIG. 3B.

Step 5 is resumed to consider the next process in the list, Tc1(n). This process has a posteriority constraint C2 "after Tc2(p)", a process that has not yet been considered.

The process Tc2(p) is moved before the process Tc1(n) in step 5.2.2, producing the list {Tp(m), Tc2(p), Tc1(n)}.

Step 5 is repeated to consider process Tc2(p) in this modified list. This process passes the test in step 5.2.1, and the execution need Bc2(p) may be placed fully in the current slot, as shown in FIG. 3B.

Step 5 is repeated one last time for the process Tc1(n). This time the process passes the test in step 5.2.1, and the execution need Bc1(n) may be placed fully in the current slot, as shown in FIG. 3B.

Applying the method to the example of FIG. 1B, assuming that the process Tc(n) is constrained to consume the data produced by the process Tp(m), the zero-latency sequencing plan of FIG. 2B is achieved.

Figure 4A:
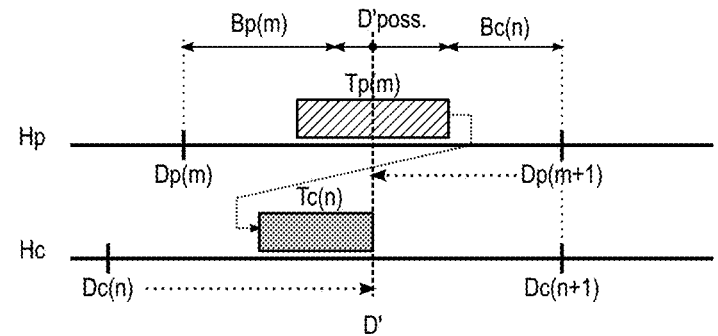
FIGS. 4A and 4B illustrate a pair of sequences of frames representing an example of two communicating tasks, and a corresponding sequencing plan constructed using an alternative method to reduce communication latency.
Figure 4B:
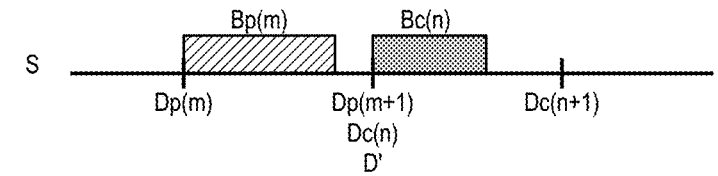

FIGS. 4A and 4B illustrate an alternative technique that can provide a sequencing plan that takes order constraints into account.

In FIG. 4A a producer process Tp(m) and a consumer process Tc(n) are considered in the same conditions as the first two tasks of FIG. 3A. According to this alternative, it is sought to place an intermediate synchronization point D' associated with the order constraint between the two processes. This point D' is intended to replace the deadline Dp(m+1) of the producer process and the start date Dc(n) of the consumer process. As illustrated, this synchronization point can be arbitrarily placed in a date range D'poss from Dp(m)+Bp(m) to Dc(n+1)−Bc(n).

In FIG. 4B, the synchronization points may be projected on a time scale S, but the start date Dc(n) of the consumer process and the deadline Dp(m+1) of the producer process are shifted to the same intermediate point D'. The resulting slots can then be processed in sequence in the usual way, now without considering the order constraints, which would provide the sequencing plan shown in FIG. 4B. It can be seen from the example taken for the position of point D', towards the center of its variation range, that the latency between the processes Tp(m) and Tc(n) is low but not zero.

To execute such a sequencing plan, the real-time system could be provided with an additional time base to materialize the intermediate synchronization points D', which would then be statically chosen among several discrete values by the development tool or developer. However, such a procedure could significantly reduce the number of possibilities for scheduling parallel tasks. For example, placing point D' at the beginning of its range would tend towards zero latency, but the execution need Bp(m) would no longer have any margin for placement.

In fact, point D' may be used temporarily in two phases. In the first phase, for the projection of the synchronization points on the scale S, it is placed at the end of its range of variation. This leaves the greatest possible freedom to place the execution need Bp(m) during the execution need distribution phase. After placing the execution need Bp(m) in its slot [Dp(m), D'], point D' is removed from the scale, resulting in the merging of slots [Dp(m), D'] and [D', Dc(n+1)] for further operations. This increases the degree of freedom for placing the execution need Bc(n) and no longer requires the use of an adapted time base in the real-time system.

This procedure is then equivalent to the six-step procedure described above. With this alternative, the probability of obtaining zero latency communications is lower, but still better than if no order constraints were used.

Up to now, it was assumed that the static sequencing plan was built for a single execution unit, or a single-core processor. The method may be extended to a multi-core processor. In this case, the sequence of time slots defined by the time scale S is duplicated for each execution unit, and an attempt is made to distribute the execution needs of all the tasks in the multiple sequences in order to construct a sequencing plan for each execution unit. The resulting sequences of slots are aligned with the respective time bases or clocks of the execution units. For sake of clarity, it is assumed in the figures that the clocks are identical. In reality, the clocks may drift with respect to each other, and the resulting offset between the clocks can be taken into account by a synchronization time $t_{sync}$, explained later.

In practice, each task is statically allocated to the same execution unit. If two interdependent tasks are thus allocated to the same execution unit, the teachings described above apply as they stand.

However, interdependent tasks may be allocated to several different execution units. In this case the method is completed as follows.

Any reference to placing an execution need in the "current slot" refers to a slot of the sequence associated with the execution unit allocated to the task. In other words, all the slots corresponding to the same slot on the scale S are "current" at the same time, one current slot for each execution unit.

The process list established in step 3 contains all the processes, regardless of the allocated execution units.

Step 5.2.1 above is rewritten as follows (the portion in square brackets [ ] has been added from the original step):

5.2.1 If the referenced process precedes the current process in the list, the order of the list is correct.

[If the referenced process is allocated to a different execution unit, a padding interval $t_{pad}$ is placed in the current slot. This padding interval corresponds to the execution need of the referenced process, or its residue, as placed in the current slot associated with the other execution unit, increased by the above-mentioned synchronization time $t_{sync}$. The synchronization time takes into account the time required for communication between execution units and the offset between the clocks of the execution units.]

The execution need of the current process is then placed in the slot, with any residue, and the procedure is repeated from Step 5.

FIGS. 5A and 5B illustrate by an example the motivation for the thus completed method step.

FIG. 5A is similar to FIG. 1B, where a process Tp(m) produces data consumed by a process Tc(n). The start date Dc(n) of the process Tc(n) is greater than the start date Dp(m) of the process Tp(m).

FIG. 5B shows two resulting sequencing plans Sp and Sc respectively associated with tasks Tp and Tc and two different execution units.

In the plan Sp, a first part Bp1($m$) of the execution need of process Tp(m) is placed in the slot [Dp(m), Dc(n)], the residue Bp2($m$) being placed at the beginning of the next slot [Dc(n), Dc(n+1)].

In the plan Sc, the slot [Dc(n), Dc(n+1)] receives a time interval equal to the residue Bp2($m$) as placed in the plan Sp, then the synchronization time interval $t_{sync}$. The sum of these intervals forms the padding interval $t_{pad}$. The execution need Bc(n) is finally placed after this padding interval $t_{pad}$. Without this padding interval, the execution need Bp(n) could be placed too early in the slot, before the end of the process Tp(m) on the other execution unit, a situation that does not occur when using a single execution unit with a single plan.

Step 5.1 is then rewritten as follows:

5.1 If the current process does not have a posteriority constraint, the execution need corresponding to this process is placed in the current slot. [If the current slot contains a padding interval $t_{pad}$, it can be used to place the execution need.] The execution need may be the residue from a previous slot. If the execution need cannot be fully placed in the current slot, the current slot is filled with a first part of the execution need and the residue is saved for the next slot.

This step thus takes advantage of the padding intervals inserted by the iterations of step 5.2.1. If necessary, an execution need may be broken down to fill the padding interval and then any remaining space at the end of the current slot.

The invention claimed is:

1. A method for constructing off-line a sequencing plan for a plurality of tasks to be executed on a real-time system, the method comprising steps performed by a processor acting as a development tool operating on a formalized description of the plurality of tasks, the steps including:

decomposing each task of the plurality of tasks into a sequence of frames, each frame being associated with an elementary process having an execution need, and each frame defines a start date from which the elementary process starts and an end date, or deadline, at which the elementary process must complete;

associating respective order constraints to process pairs;

projecting the start and end dates on a time scale associated with an execution unit of the real-time system, which forms a sequence of time slots;

sequentially parsing the time slots of the sequence;

identifying eligible processes within a current time slot, a process being eligible upon satisfying the following two criteria:

(i) the process is executable in the current slot, and (ii) the process has an order constraint, the process referenced by the order constraint is also executable in the current time slot, or the deadline of the process referenced by the order constraint is in a previous time slot;

sorting the identified eligible processes in a list by order of increasing deadlines;

modifying the list to reorder the processes according to the respective order constraints;

distributing the execution needs of the eligible processes in the current time slot in the order of the list to construct the sequencing plan; and producing the sequencing plan in a data format that configures the real-time system.

2. The method according to claim 1, further comprising an initial step of removing the order constraints in each pair formed of two processes whose frames do not overlap.

3. The method according to claim 1, wherein the step of modifying the list and the step of distributing the execution needs comprise steps of:

parsing the list of processes sequentially;

upon a current process in the list having an order constraint referencing a process placed after the current process in the list, modifying the list by moving the referenced process before the current process;

resuming parsing of the list by starting at a position of the moved referenced process; and otherwise placing the execution need of the current process in the current slot.

4. The method according to claim 3, wherein the step of placing the execution need comprises steps of:

placing the execution need fully in the current slot when the current slot has enough space to accommodate the execution need; and otherwise filling the current slot with a first part of the execution need and postponing placement of a remainder of the execution need to a subsequent slot.

5. The method according to claim 3, wherein the real-time system includes a plurality of execution units, which are executed by the processor, the method further comprising steps of:

associating with each execution unit of the plurality of execution units a copy of the sequence of time slots to form a sequencing plan for each execution unit;

allocating each of the plurality of execution units to tasks such that processes linked by order constraints are executed on different execution units; and in the execution need placement step:

placing the execution need in the current slot of the plan associated with the current process, and placing in the current slot of the plan associated with the referenced process a padding interval corresponding to the placed execution need increased by a synchronization time taking into account delays occurring in communication of data between two execution units and an offset between clocks of the two execution units.

6. The method according to claim 5, wherein the step of placing the execution need in the current slot comprises placing the execution need in any padding interval contained in the current slot.

7. A method of executing tasks in a real-time multitasking system, the method comprising steps of:

(a) constructing off-line a sequencing plan for a plurality of tasks, the constructing step including:
  decomposing each task of the plurality of tasks into a sequence of frames, each frame being associated with an elementary process having an execution need, and each frame defines a start date from which the elementary process starts and an end date, or deadline, at which the elementary process must complete;
  associating respective order constraints to process pairs;
  projecting the start and end dates on a time scale associated with an execution unit of the real-time system, which forms a sequence of time slots;
  sequentially parsing the time slots of the sequence;
  identifying eligible processes within a current time slot, a process being eligible upon satisfying the following two criteria:
   (i) the process is executable in the current slot, and
   (ii) the process has an order constraint, the process referenced by the order constraint is also executable in the current time slot, or the deadline of the process referenced by the order constraint is in a previous time slot;
  sorting the identified eligible processes in a list by order of increasing deadlines;
  modifying the list to reorder the processes according to the respective order constraints; and
  distributing the execution needs of the eligible processes in the current time slot in the order of the list to construct the sequencing plan;
(b) configuring the real-time multitasking system execution unit to apply the sequencing plan in a loop;
(c) configuring a time base of the real-time multitasking system to clock the time slots of the sequencing plan;
(d) sequentially running the eligible processes of each slot in the order in which the corresponding execution needs are distributed within the slot; and (e) checking that the process execution times conform with the corresponding execution needs.

8. The method according to claim 7, further comprising an initial step of removing order constraints in each pair formed of two processes whose frames do not overlap.

9. The method according to claim 7, wherein the step of modifying the list and the step of distributing the execution needs include:
  parsing the list of processes sequentially;
  upon a current process in the list having an order constraint referencing a process placed after the current process in the list, modifying the list by moving the referenced process before the current process;
  resuming the list parsing starting at the position of the moved referenced process; and
  otherwise placing the execution need of the current process in the current slot.

10. The method according to claim 8, wherein the step of placing the execution need includes:
  placing the execution need fully in the current slot when the slot has enough space to accommodate the execution need; and
  otherwise filling the current slot with a first part of the execution need and postponing a placement of a remainder of the execution need to a subsequent slot.

11. The method according to claim 9, wherein the real-time system comprises a plurality of execution units executed by the processor, the method further comprising steps of:
  associating with each execution unit of the plurality of execution units a copy of the sequence of time slots to form a sequencing plan for each execution unit;
  allocating each of the plurality of execution units to tasks such that processes linked by order constraints are executed on different execution units; and
  in the execution need placement step:
   placing the execution need in the current slot of the plan associated with the current process, and
   placing in the current slot of the plan associated with the referenced process a padding interval corresponding to the placed execution need increased by a synchronization time taking into account delays occurring in communication of data between two execution units and an offset between clocks of the two execution units.

12. The method according to claim 11, wherein the step of placing the execution need in the current slot comprises placing the execution need in any padding interval contained in the current slot.

* * * * *